(12) United States Patent
Khouri et al.

(10) Patent No.: US 9,160,858 B2
(45) Date of Patent: Oct. 13, 2015

(54) ROUTING OF WORK IN AN ENTERPRISE BASED UPON SOCIAL INFORMATION ASSOCIATED WITH ENTERPRISE AGENTS AND CLIENTS

(71) Applicant: Cisco Technology, Inc., San Jose, CA (US)

(72) Inventors: Joseph Khouri, San Jose, CA (US); Biren Gandhi, San Jose, CA (US); Gebran Chahrouri, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/154,733

(22) Filed: Jan. 14, 2014

(65) Prior Publication Data

US 2015/0201078 A1 Jul. 16, 2015

(51) Int. Cl.
*H04M 3/51* (2006.01)
*H04M 3/523* (2006.01)

(52) U.S. Cl.
CPC .................................. *H04M 3/5233* (2013.01)

(58) Field of Classification Search
CPC ...................................................... H04M 3/5233
USPC .......................... 379/265.01, 265.02, 265.09, 379/265.11–265.14
See application file for complete search history.

(56) References Cited

U.S. PATENT DOCUMENTS

| 6,546,087 | B2 | 4/2003 | Shaffer et al. |
| 8,290,139 | B2 | 10/2012 | Kumar et al. |
| 2002/0114432 | A1* | 8/2002 | Shaffer et al. ............... 379/90.01 |
| 2009/0190729 | A1* | 7/2009 | Chakraborty et al. ... 379/112.01 |
| 2009/0228486 | A1 | 9/2009 | Kuehr-McLauren et al. |
| 2010/0027778 | A1* | 2/2010 | Kumar et al. ............ 379/265.09 |
| 2012/0005106 | A1 | 1/2012 | Famous |

* cited by examiner

*Primary Examiner* — Harry S Hong
(74) *Attorney, Agent, or Firm* — Edell, Shapiro & Finnan, LLC

(57) ABSTRACT

Techniques are provided for receiving incoming work at an enterprise, obtaining social information for agents of the enterprise, comparing the social information obtained for the enterprise agents with information associated with the incoming work, and assigning the incoming work to a selected enterprise agent based upon at least one common feature included in the social information for the selected enterprise agent and the incoming work.

15 Claims, 9 Drawing Sheets

ROUTING OF WORK IN AN ENTERPRISE BASED UPON SOCIAL INFORMATION ASSOCIATED WITH ENTERPRISE AGENTS AND CLIENTS

TECHNICAL FIELD

The present disclosure relates to the utilization of social graphs and routing of work to people within a particular business or enterprise.

BACKGROUND

In large business or other enterprise systems, it can be challenging at times to make a determination regarding where and to whom to route new work projects or work activities.

For example, in call contact centers, it can be important in certain scenarios to match an incoming call associated with a customer or client with an appropriate call agent. If a call agent can establish a suitable rapport with the client of a call, there can be a greater likelihood of resolving any issue for the client and/or providing a better experience for the client during the call. In other work scenarios, a work project or work activity that is assigned to an employee who might have an enhanced interest in the project/activity can also result in more efficient work flow with greater employee satisfaction.

DESCRIPTION OF EXAMPLE EMBODIMENTS

Overview

Figure 1:
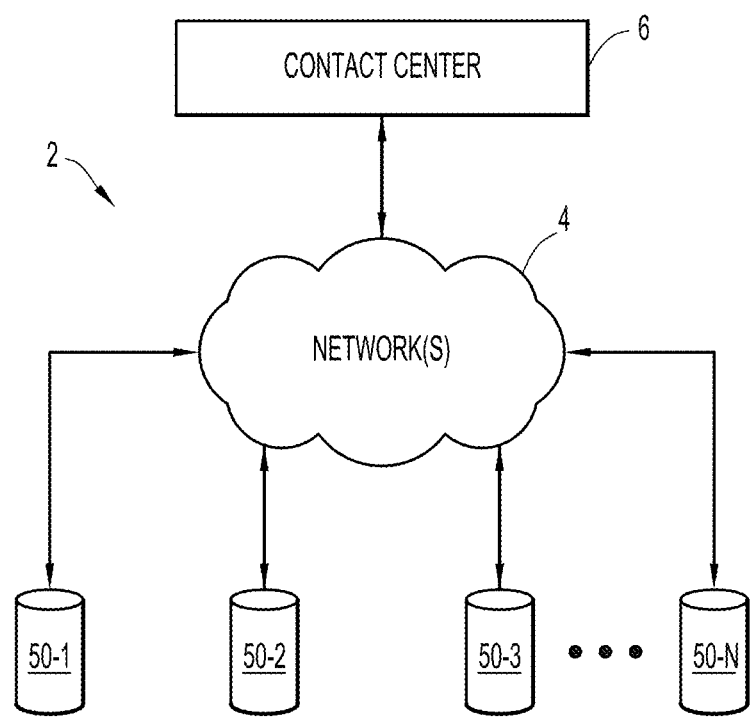
FIG. 1 is a schematic block diagram of an example system in which a call center is connected via a network with one or more social information sources.

Techniques are provided for receiving incoming work at an enterprise, obtaining social information for agents of the enterprise, comparing the social information obtained for the enterprise agents with information associated with the incoming work, and assigning the incoming work to a selected enterprise agent based upon at least one common feature included in the social information for the selected enterprise agent and the incoming work.

In example embodiments, techniques are described herein in which the incoming work comprises an incoming communication request from a customer to a contact center, and social information is obtained for the customer from one or more social information sources. The social information obtained for the customer is compared with obtained social information for each of the plurality of enterprise agents. Incoming work is assigned to the selected enterprise agent by identifying at least one common feature based upon the comparison of the social information obtained for the customer with the social information for each agent of the plurality of agents, determining the selected enterprise agent from the plurality of enterprise agents based upon communication routing criteria, the communication routing criteria being at least partially dependent on the at least one common feature, and routing the communication request from the customer to the selected enterprise agent to facilitate a communication between the customer and the selected enterprise agent.

Example Embodiments

Work flow within an enterprise (e.g., a business, a for-profit or non-profit organization or association, etc.) is enhanced utilizing techniques as described herein. In particular, work is routed to particular enterprise agents (e.g., employees, members, etc.) based upon similarities between the nature of the work and social information or social activities associated with the enterprise agents. Work can also be routed based upon similarities between social information or social activities associated with the enterprise agents and clients associated with the work to be routed to enterprise agents.

As described herein, the social information or social activities associated with enterprise agents and other people (e.g., customers or clients associated with an enterprise) that are used to route work to enterprise agents can be obtained from one or a combination of sources (e.g., social networking sites, from information gathered from one or more enterprise systems, etc.). Social information that is gathered for each person can be used to generate a social graph for that person to summarize that person's various social activities. A social graph describes the social relationships between a person and other persons, activities, topics, etc. based upon the person's activities at one or more online network platforms, where the online network platforms can include, e.g., social networking websites (e.g., Facebook, Instagram, LinkedIn, Twitter, Google+, MySpace, Yammer, Jive, etc.), business or other enterprise collaboration and/or unified communications platforms that support emailing, instant messaging, and various other types of communications within an enterprise (e.g., Cisco Webex Social and/or Cisco Jabber by Cisco Systems, Inc., Microsoft Sharepoint by Microsoft Corporation, etc.) and any other types of network platforms in which a person engages in communications or activities with others. The social graph can be represented as a series of connected or interlinked nodes representing social information attributes, where each of the social information attributes comprises an item of social information such as a topic (e.g., a word or phrase) representing a social activity, a person (e.g., a person's name), etc. that are associated in some manner with a person represented by the social graph. A central node of the social graph, from which all other nodes are connected or linked (either directly or indirectly), represents the person. The closer certain nodes are linked to the node representing the person within the social graph provides an indication of how relevant such nodes are to the person. For example, a node connected directly to the central node representing the person is considered to have greater priority or weighting in relation to another node that is indirectly connected to (i.e., having one or more nodes of separation from) the central node.

Referring to FIG. 1, an example embodiment of a system that is configured to route work to agents of an enterprise based upon social information associated with the agents is depicted as a call center system 2. As described herein, the call center system 2 is an enterprise configured to receive calls from customers or clients of the enterprise and route the calls to agents of the call center (e.g., customer services representatives of the enterprise). However, it is noted that the techniques described herein are not limited to call center systems but instead are applicable to any enterprise in which work associated with the enterprise is routed to one or more employees or agents of the enterprise based upon social information associated with the agents.

The call center system 2 includes a contact center 6 configured to receive multiple calls from customers at any given time and route such calls to contact agents. The contact center 6 is connected via one or more networks 4 to a plurality of social information sources 50 (depicted in FIG. 1 as sources 50-1 to 50-N). The social information sources 50 can be any social networking platforms hosted over the one or more networks 4 (e.g., social networks such as Facebook, Instagram, LinkedIn, Twitter, Google+, MySpace, Yammer, Jive, etc., and enterprise collaboration and/or UC platforms such as Cisco Webex Social and/or Cisco Jabber by Cisco Systems, Inc., Microsoft Sharepoint by Microsoft Corporation, etc.), where the social information sources 50 can include any one or more servers which host operations of the sources 50, any one or more memory storage structures that store the social information associated with users of the social networking platforms, as well as any other suitable computing devices required for operation of the information sources. The contact center 6 does not collect social information directly from the customer, but instead the contact center 6 is configured to automatically collect social information indirectly for the customer based upon the customer's interaction at the social information sources 50 (i.e., social information is gathered or collected about a customer from the information sources 50 with which the customer interacts).

The contact center 6 is configured to communicate with such social information sources 50 to obtain information at any given time for people (e.g., for call agents of the contact center 6 and/or customers associated with the contact center 6), where the social information can be obtained at specified time intervals and/or in real-time or near real-time (e.g., obtaining social information for a customer in real-time or near real-time when the customer contacts the contact center 6) in order to build or update a social graph associated with a person.

The one or more networks 4 of system 2 facilitate communications and exchange of information between the contact center 6 and social information sources 50 as well as any other types of computing devices that communicate with the contact center. Examples of types of networks that can be utilized within system 2 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

Figure 2:
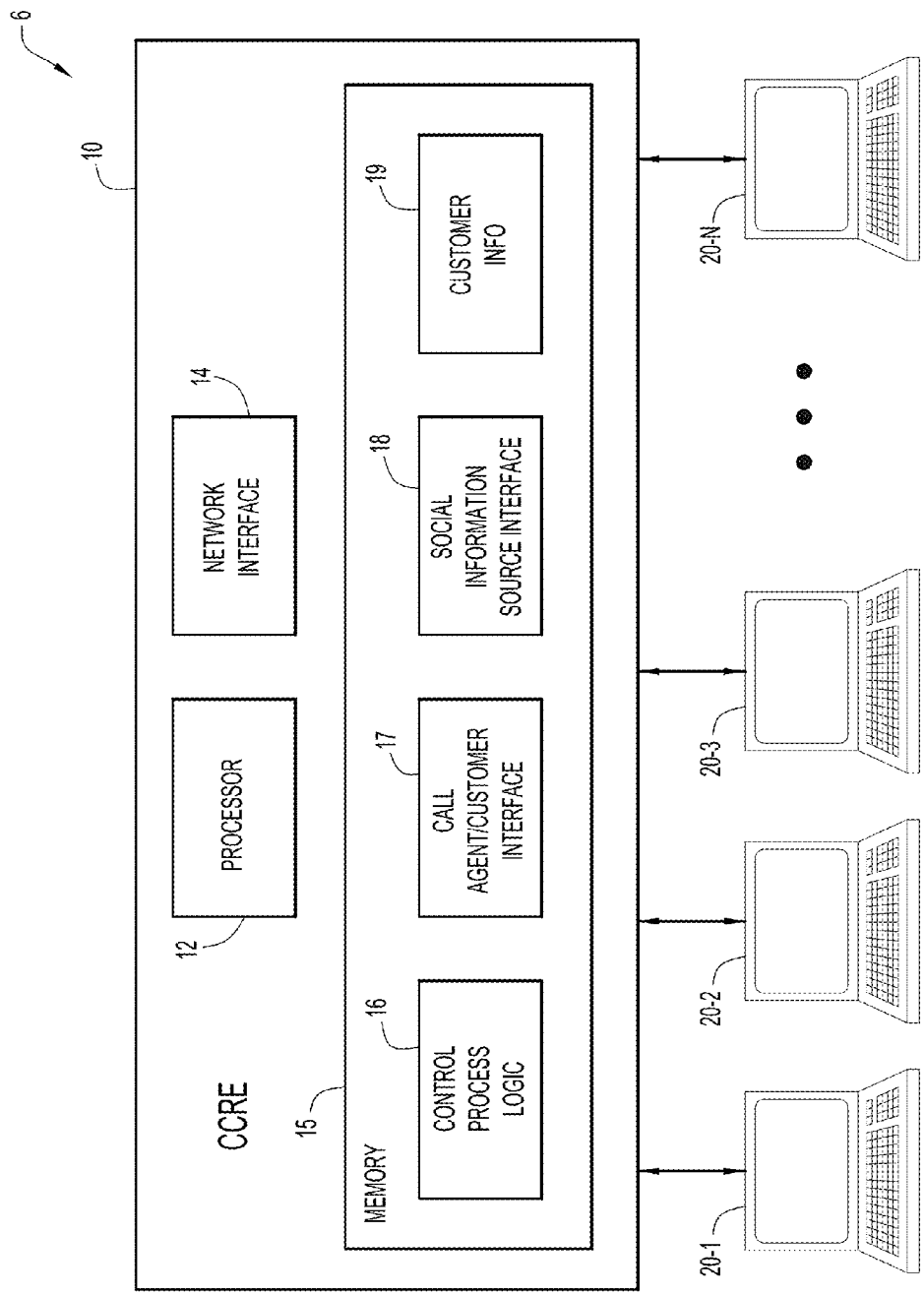
FIG. 2 is a schematic block diagram of an example embodiment of a call center for the system of FIG. 1.

An example embodiment of the call center 6 is depicted in FIG. 2. The call center 6 includes a CCRE (call center routing engine) 10 that communicates with a plurality of call agent devices 20 (depicted as 20-1 to 20-N in FIG. 2) via the one or more networks 4 and/or any other suitable communication link (e.g., via a LAN in scenarios in which the call center 6 comprises a single enterprise location, or over a WAN and/or other suitable networks in scenarios in which the call center 6 comprises two or more geographically spaced enterprise locations).

The CCRE 10 includes at least one processor 12, at least one network interface 14, and a memory 15. Each network interface 14 can comprise, for example, one or more of an Ethernet interface card or switch, a modem, a router or any other suitable hardware device that facilitates a wireless and/or hardwire connection over the one or more networks 4 with one the social information sources 50, the call agent devices 20, as well as any other suitable computing and/or communication devices (e.g., connection with customer client devices) to facilitate operations of the CCRE 10.

Each processor 12 of the CCRE 10 can comprise a microprocessor that executes control process logic instructions 16 stored within memory 15, including operational instructions and software applications stored within such memory (e.g., applications associated with operations performed by the CCRE). In general, the memory 15 may comprise one or more tangible (non-transitory) computer readable storage media (e.g., a memory device) encoded with software comprising computer executable instructions and when the software is executed (by the one or more processors 12) it is operable to perform the operations described herein for routing customer calls to call agent devices 20 based upon social information of both the customers and call agents.

The memory 15 of the CCRE 10 may comprise read only memory (ROM), random access memory (RAM), magnetic disk storage media devices, optical storage media devices, flash memory devices, electrical, optical, or other physical/tangible memory storage devices, and any combinations thereof. The operational software of memory 15 includes a call agent/customer interface module 17, a social information source interface module 18 and a customer information module 19, where each module comprises one or more software applications including instructions executable by the one or more processors 12 to perform operations associated with routing customer calls to call agent devices 20 based upon social information of both the customers and call agents as described herein.

Figure 3:
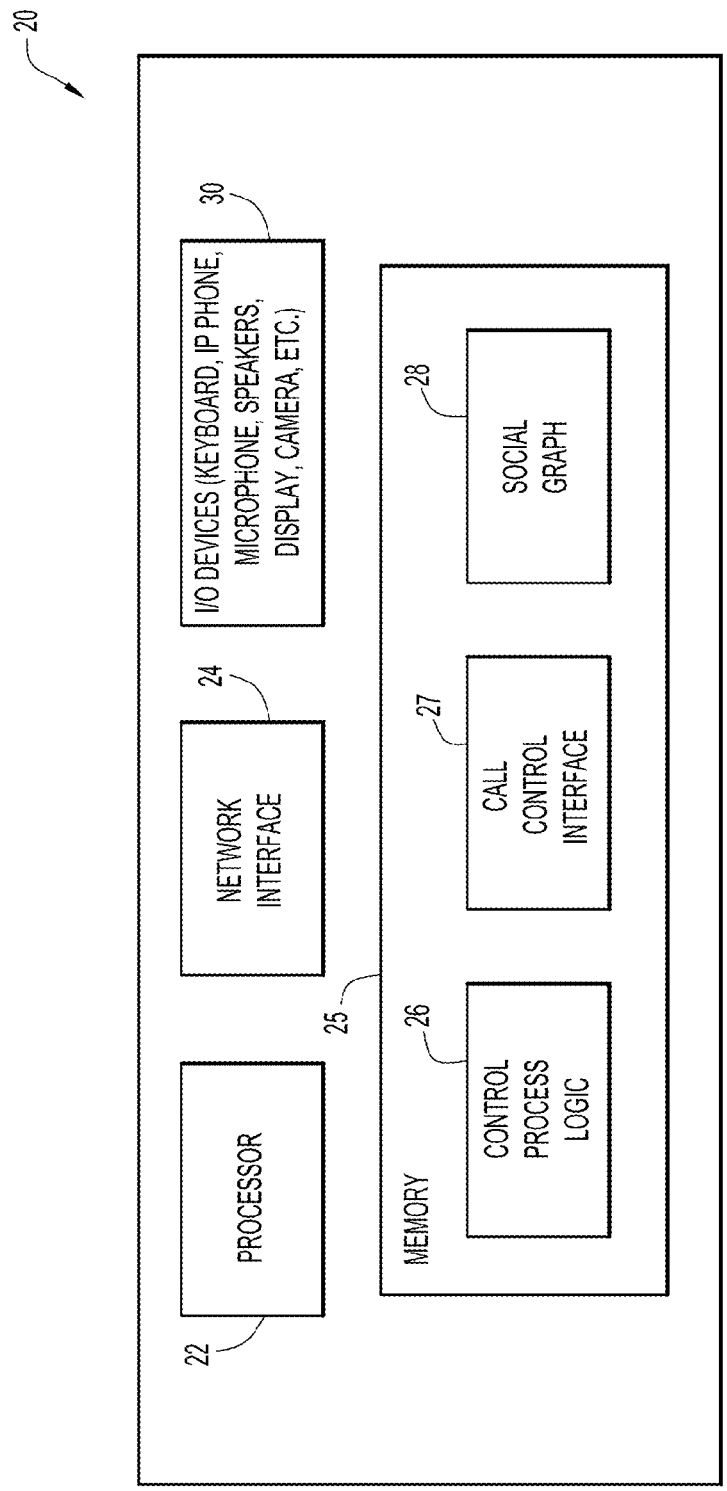
FIG. 3 is a schematic block diagram of an example embodiment of a call agent device for the call center of FIG. 2.

Referring to FIG. 3, an example embodiment of a call agent device 20 comprises any suitable computing device (e.g., a stationary/desktop computer, a laptop, note pad, tablet, cellular smart phone, etc.) configured to communicate and exchange information with the CCRE 10 as well as communicate with outside client devices of customers that are routed to the call agent device 20 by the CCRE. An example embodiment of a call agent device 20 is a desktop computer that is configured to engage in suitable communications (e.g., VoIP or Voice over Internet Protocol communications) between the desktop computer (or a VoIP phone integrated with the desktop computer) of a call agent associated with the device 20 and a customer client device (e.g., a landline telephone, wireless mobile/cellular phone or any other suitable computing device configured for facilitating VoIP or other suitable communications) while also providing a suitable display to provide information useful to the call agent during such communication.

The call agent device 20 includes at least one processor 22, at least one network interface 24, and a memory 25, each of which can be of a similar type or configuration as that previously described for the CCRE 10. For example, the network interface 24 of each call agent device 20 facilitates connections with the CCRE 10 and customer client devices during operation. Each processor 22 can comprise a microprocessor that executes control process logic instructions 26 stored within memory 25, including operational instructions and software applications stored within such memory, where the memory 25 may comprise one or more tangible (non-transitory) computer readable storage media (e.g., a memory device) encoded with software comprising computer executable instructions and when the software is executed (by the one or more processors 22) it is operable to perform the operations described herein and associated with the call agent device 20.

The memory 25 of the call agent device 20 includes a call control interface module 27 and a social graph module 28, where each module comprises one or more software applications including instructions executable by the one or more processors 22 to perform operations associated with the call agent device 20 as described herein.

The call agent device 20 also includes any suitable input and output devices (generally depicted in FIG. 3 as I/O devices 30) including, without limitation, keyboards, IP phones (e.g., phones utilizing VoIP communications), microphones, speakers, cameras, touch pads, mouse devices, one or more displays, etc, where the I/O devices can be integrated as part of the call agent device 20 and/or provided as peripheral devices that connect with the call agent device 20.

Each of the call agent devices 20 and the CCRE 10 can utilize any suitable operating systems (e.g., Android, Windows, Mac OS, Symbian OS, RIM Blackberry OS, Linux, etc.) to facilitate communications and exchange of information between the each other and over the one or more networks 4 (e.g., with other computing devices, such as customer client devices).

Figure 4:
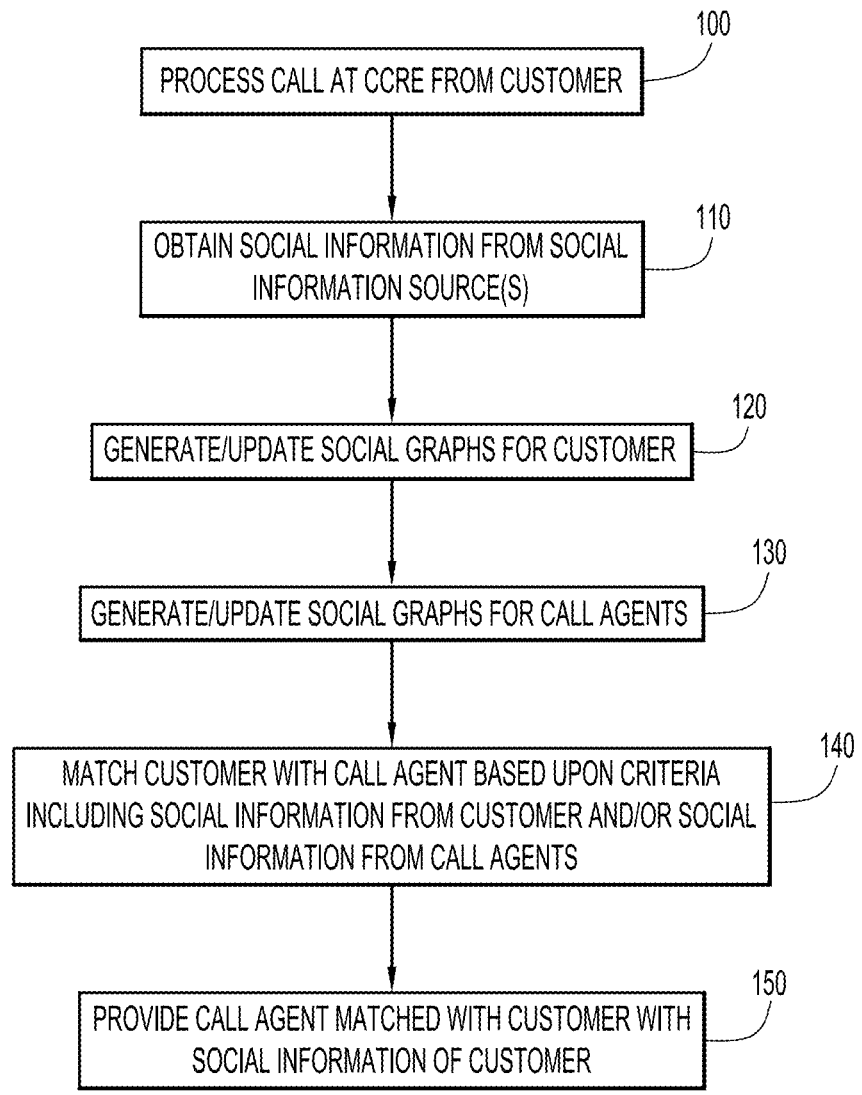
FIG. 4 is a flow chart depicting an example process for routing calls to agents based upon similarities between social graphs of call clients and call agents.

Techniques for routing work to agents of an enterprise based upon social information associated with the agents and/or social information associated with customers is now described in relation to the call center system 2 of FIGS. 1-3 and also with reference to the flow chart of FIG. 4.

At 100, a call from a customer is initially received and processed at the CCRE 10 (via the call agent/customer interface module 17 and customer information module 19). For example, a customer may call a customer service number using the customer's client device (e.g., using a land-line or mobile phone of the customer), and this call is routed initially to the CCRE 10. The call agent/customer interface module 17 of the CCRE 10 is utilized to process the customer call by initially identifying the customer (e.g., via any suitable caller identification technique including, without limitation, identification of the origination address of the call to identify the customer, input of any identification information by the customer as prompted by the contact center 6 prior to routing of the call to a call agent, etc.). Information stored and accessible by the customer information module 19 can also be used to match the incoming call from the customer to any information stored by the contact center 6 in relation to the customer.

It is noted that, while the example embodiments are described as calls from customers to a contact center, the techniques described herein can be implemented based upon any form of incoming communications from customers including, without limitation, video phone calls, emails, instant messaging (IM) communications, etc. In addition, the techniques described herein can be implemented in scenarios in which communications initiated by customers to call centers in one format (e.g., email or instant message) can be converted to communications of another format (e.g., to an audio and/or video phone call).

After the customer has been identified, one or more software applications of the module 17 are utilized to determine which call agent would be most suitable to direct the call from the customer. In particular, the module 17 provides one or more suitable algorithms for determining a suitable call agent to handle the call at the present time. The algorithms can include standard or conventional algorithms for handling call routing of customers to call agents, where the criteria for such algorithms may be based upon, e.g., number of incoming calls on hold and waiting for particular call agents (e.g., applying algorithms that assign incoming customers within a queue of a call agent so as minimize wait time for the customer), any historical information associated with the customer (e.g., a known history of the customer that defines the customer as a potentially problematic caller may result in assignment of the customer call to a more experienced call agent or a call agent that is suitably ranked within a call agent ranking system by the contact center 6), etc. In accordance with the techniques described herein, the algorithms for determining which call agent to route a customer call are also based upon social information for available call agents as well as social information for customers.

At 110, the CCRE 10, utilizing the social information source interface 18 and/or customer information module 19, communicates with one or more social information sources 50 to obtain social information about the identified customer. In particular, the information sources 50 are queried by the CCRE 10 to obtain up-to-date or near real-time social information about the customer based upon the most recent social activities of the customer at the particular social information sources 50. As previously noted, the social information sources 50 can be any social networking website or social collaboration network at which the customer has been engaged (e.g., by postings or other social activities by the customer at such sources 50). The up-to-date or near real-time social information is obtained by collecting the social information over a given time period or window that includes the present time at which the collecting process is performed. The specific social information sources 50 that may be queried by the CCRE 10 for a particular customer may have been predetermined based upon previous information provided by the customer to the contact center 6 (e.g., general volunteer information provided by a customer to the contact center 6 at some previous point in time in relation to social networking sites or other social networking platforms to which the customer belongs and/or is actively engaged). Alternatively, or in combination with predetermined information about social information sources 50 that are used by customers, the CCRE 10 can also determine or "learn" on its own certain social information sources 50 that are used by customers by searching at such sources 50 and/or searching over the one or more networks 4 (e.g., Internet searching) for any social activities associated with customers. Information about the social information sources 50 that the CCRE 10 determines are associated with customers is stored by the contact center 4 and accessible via module 19.

Any suitable one or more types of social information can be collected by the CCRE 10 for a customer from the one or more social information sources 50 including, without limitation, specific blogs or posts by the customer at such sources 50, people with whom the customer has been most recently associated with at such sources 50 (e.g., based upon social activities most recently engaged in by the customer), specific topics that are deemed most important to the customer at the present time at which the social information is collected, etc. Examples of topics of interest to a customer at a social information source 50 can include key words, phrases or tags that have already been defined for the customer by the social information source 50 to which the customer is associated and based upon recent social activities of the customer at such source 50 (e.g., hash tags associated with a customer who has a registered account with one or more social network platforms such as Twitter, Facebook and Instagram). The social information that is obtained for customers can be personal information and/or professional information about the customers as well as both publicly accessible and private information (where the CCRE 10 has authorized access to such private information).

At 120, a social graph can be generated or updated for the customer (utilizing, e.g., the social information source interface module 18 and/or customer information module 19) based upon the social information obtained or collected for recent social activities at social information sources 50 as well as previous social information and/or a previous social graph associated with the customer (e.g., based upon one or more previous calls the customer may have engaged in with call agents at the call center over a particular time period). For example, in a scenario in which a customer is a first time caller, a social graph may need to be initially generated (or obtained from a suitable social information source 50) for the customer, where social information that has been collected for the customer at 110 can be used to create, modify or update the social graph of the customer. In a scenario in which a customer is a return or repeat caller to the contact center (e.g., the customer has called N number of times over a given time period), the most recent version of the social graph of the customer can be stored by the contact center 6 (or made accessible at one or more of the social information sources 50) for access and use by the CCRE 10. In this scenario, the collected social information at 110 can be used to update the most recent version of the social graph of the customer (rather than generating a new social graph). Alternatively, in certain embodiments, the social graph for a customer can be newly generated each time the customer calls the contact center.

Figure 6:
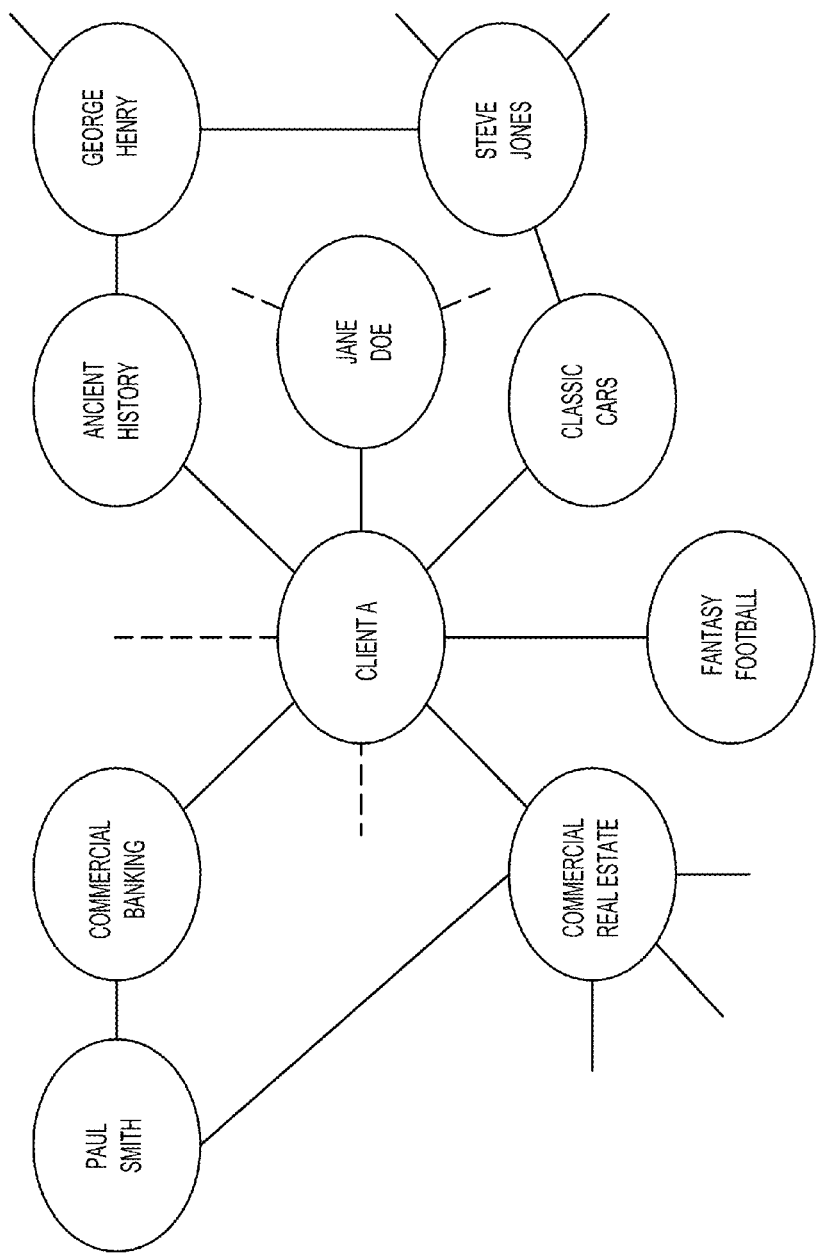
FIGS. 6-9 are example embodiments of social graphs of a call client and call agents associated with an example scenario for implementing routing of client calls to call agents of the system of FIG. 1.

The social graph provides a link between a person and their social information and can be implemented and/or visualized as a series of nodes that are linked either directly or indirectly to each other. For example, the person that is the subject of the social graph can be represented as a central node from which other nodes are located, where nodes linked directly with the central node are prioritized with greater social relevance to the person in relation to nodes further distanced and indirectly linked to the central node (e.g., indirectly linked by one or more nodes from the central node). An example embodiment of a social graph for a customer (Client A) is depicted in FIG. 6. Each node represents some portion of social information associated with the customer (e.g., a person, a word, a phrase or a tag associated with Client A based upon Client A's social activities at the one or more social information sources 50).

Any suitable algorithms can be utilized to generate and/or update social graphs, in which nodes representing portions of social information for a person are prioritized (i.e., provided at designated link distances) from the central node representing the person based upon any suitable criteria obtained as part of the social information from the sources 50 and/or established by the one or more software applications of the social information source interface module 18 and/or customer information module 19. For example, social information obtained for a customer from a particular social information source 50 may already be prioritized (e.g., based upon a social graph for the customer at a source 50 and/or any other suitable prioritizing schemes utilized by such source 50). Social information obtained from multiple sources 50, which may already be prioritized at each source 50, may be further prioritized when combined for use by the CCRE 10 as it is collected. For example, in a scenario in which a common hash tag exists for a customer at two different social information sources 50, the CCRE 10 (utilizing one or more algorithms implemented utilizing module 18 and/or module 19) may generate or update the social graph of the customer such that the node represented by the hash tag has a prioritization that is the same or similar as in at least one of the sources 50 from which it was obtained.

The generation or updating of a social graph can be performed by the CCRE 10 and/or updated from the social information sources 50 from which social information is collected for the customer. For example, the CCRE 10 can generate or update a social graph for the customer (which is stored at the contact center 6 and accessible via module 19) based upon social information received from the one or more sources 50. Alternatively, social graphs can be obtained from sources 50 as part of the social information collected, such that the CCRE 10 simply utilizes the most recent or up-to-date social graph or social graphs obtained from the sources 50 at the time in which such sourced 50 are queried. In scenarios in which two or more social graphs for a customer may be obtained from sources 50 as part of the collected or obtained social information, the CCRE 10 may further process the social graphs in any suitable manner and utilizing any suitable algorithms (implemented utilizing module 18 and/or module 19) to generate a single social graph that incorporates social information from each social graph obtained from the sources 50.

At 130, the social graphs of one or more call agents are generated or updated in any suitable manner, such as a manner similar to how social graphs for customers are generated or updated. The social graph for each call agent can be provided to the CCRE 10 by the call agent device 20 associated with such call agent, where the social graph module 28 is utilized to generate or update the social graph of the call agent. Alternatively, the CCRE 10 can also generate and/or update the social graphs of call agents via communication with call agent devices 20.

Since each call agent device 20 is designated for a particular call agent, it may be preferable to generate and update the social information and social graph of each call agent at his or her own device 20. Further, updating of the social information and social graph by the call agent device 20 for each agent can occur in real-time or near real-time as an ongoing process (i.e., as social activities and corresponding social information changes occur) since the call agent device 20 may be best configured to monitor and update the social information for the call agent (i.e., particularly if the call agent uses the call agent device 20 to engage in social activities at one or more sources 50). In such scenarios, call agent devices 20 can provide social information and/or social graphs to the CCRE 10 at any selected time intervals or at any request by the CCRE 10.

At 140, the CCRE 10, utilizing module 17, applies communication routing criteria to match the customer with an appropriate call agent and routes the incoming call to the call center 6 from the customer's client device to the call agent device 20. As previously noted, the CCRE 10 can utilize algorithms (implemented, e.g., utilizing module 17) based upon standard or conventional prioritizations associated with routing incoming customer calls to call agents (e.g., based upon factors such as: call agent availability (e.g., how many calls are already in the queues of call agents so that the customer call is routed to the first available agent to minimize call wait times); a known or predetermined customer history information associated with the call center (e.g., whether the customer is designated as being potentially problematic due to previous calls associated with the call center, in which case the customer may be routed to a call agent that is designated as experienced or enterprise certified to handle potentially problematic calls; whether the customer has a history or good working relationship or rapport with one or more specific call agents, in which case those specific call agents might have higher priorities for communicating with the customer; etc.). However, the techniques described herein provide further prioritizations for routing customer calls based upon social information associated with the customers and the call agents so as to match a call agent with a customer that have similarities in their social interests.

Any selected number and types of algorithms can be implemented by the CCRE 10 to determine one or more matches that prioritize a routing of the customer call to the appropriate call agent based upon the collected and up-to-date social information of the customers and call agents. For example, suitable matching between customer and call agent may be based upon a comparison to determine the closest intersections or commonalities between the social graph of the customer and the social graph of the call agent. A call agent that may have a social graph including one or more common or similar nodes that are at the same or similar node distances from a central node in relation to the social graph of a customer may be designated as the most appropriate agent to be routed the call so as to communicate with the customer.

Figure 7:
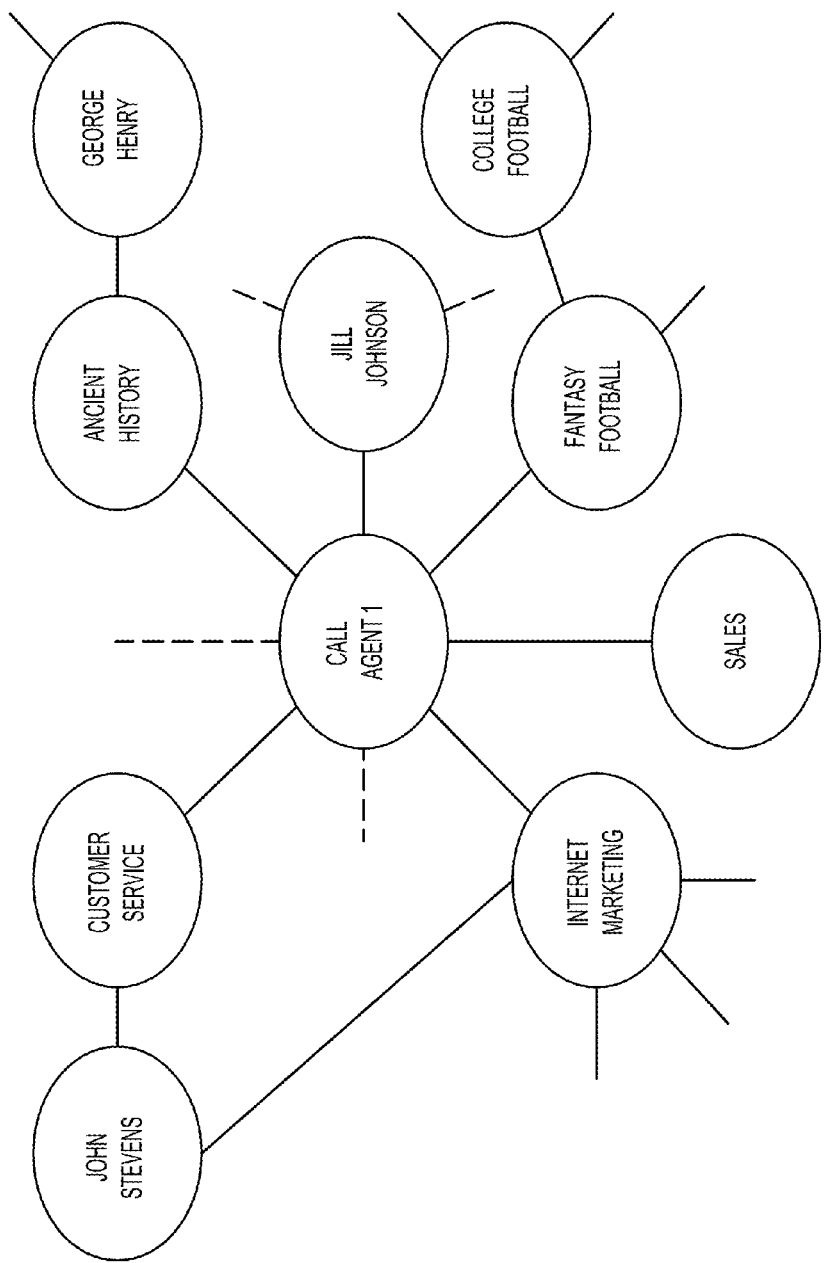
Figure 8:
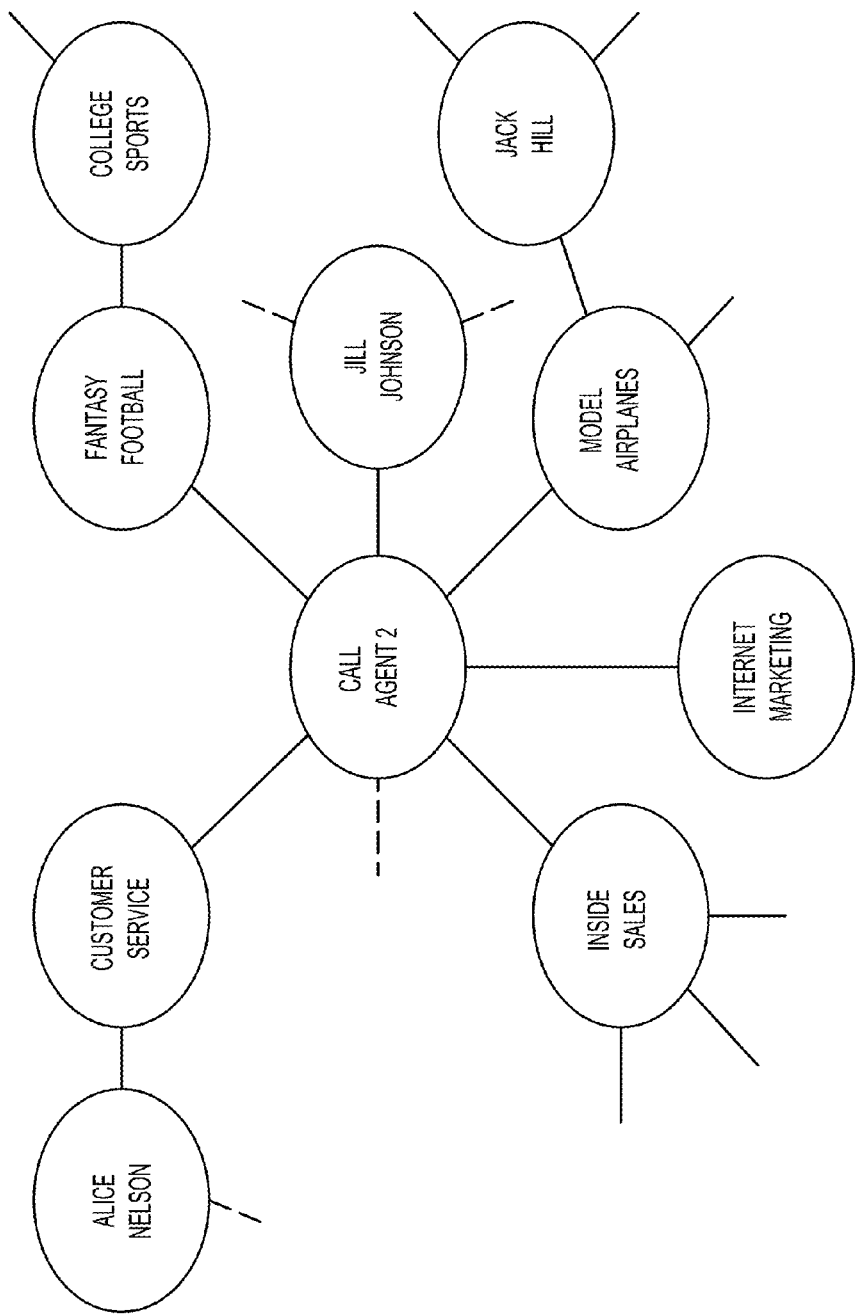
Figure 9:
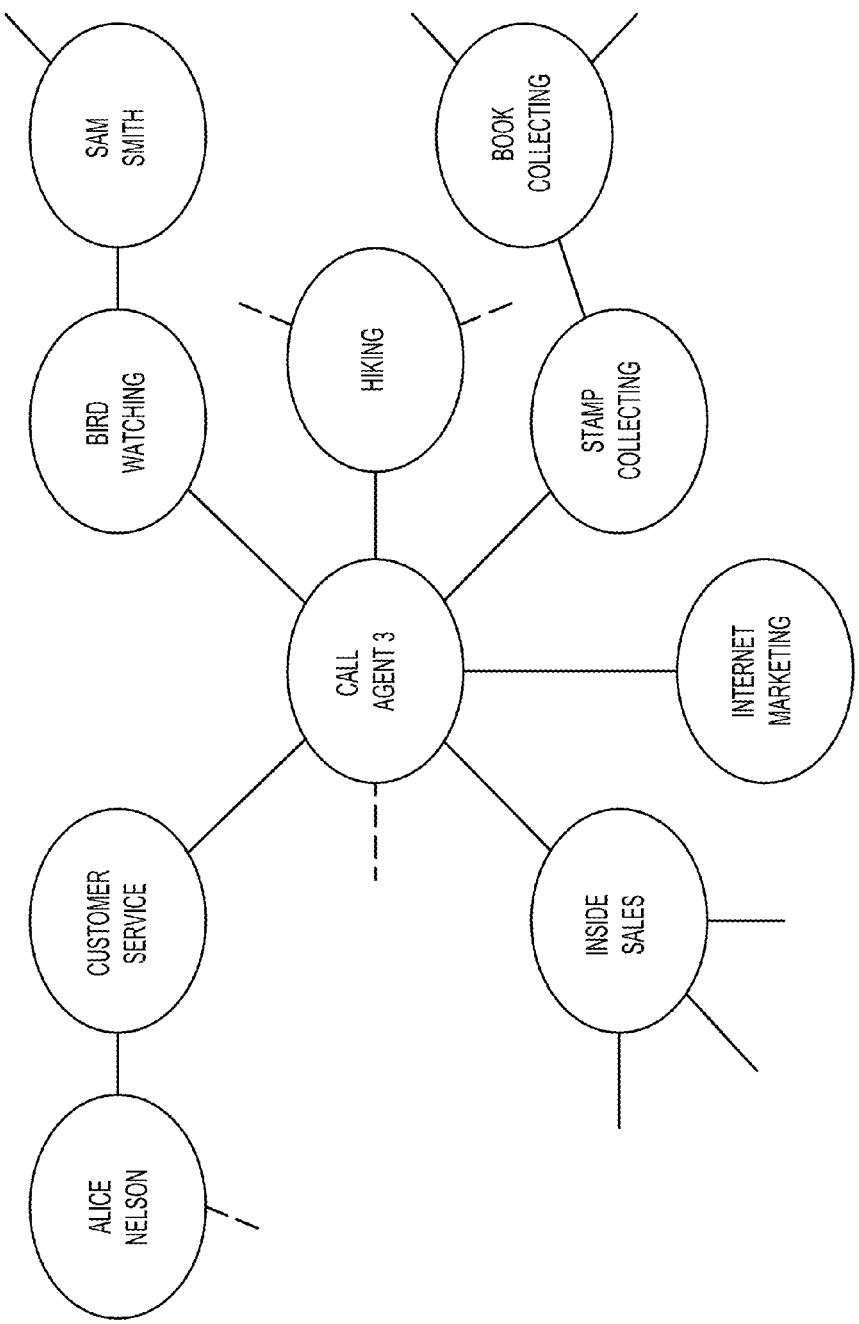

Consider an example scenario in which a customer, Client A, calls into the call center 6. A social graph of Client A is obtained by the CCRE 10, based upon collecting social information from one or more social information sources 50. An example embodiment of a social graph obtained for Client A is depicted in FIG. 6. Example embodiments of social graphs obtained for three Call Agents 1-3 are depicted in FIGS. 7-9, respectively. It is noted that these social graphs are simplified for purposes of illustration of the techniques described herein, and that the techniques described herein can be implemented utilizing social graphs that are more complex in structure (e.g., three dimensional social graphs and other social graphs with many more links between nodes than what are shown in the social graphs of FIGS. 6-9).

A comparison of the social graph of Client A (FIG. 6) with the social graphs of each of the Call Agents 1-3 (FIGS. 7-9) is conducted by the CCRE 10 (utilizing module 17) to determine which call agent may be the best social match with Client A based upon similarities between social graphs. For example, a comparison can be made between nodes including distances of the nodes from a central node of the social graph of the customer and nodes including distances of the nodes from a central node of the social graph for each enterprise agent. The call agent having a social graph with the most nodes with the same or similar node information attributes (and or the same or similar node distances in relation to the central node) as the nodes of the social graph of the customer may be considered as having the highest priority in relation to other call agents.

Based upon the algorithms utilized by the CCRE 10, routing of the call for Client A in relation to Call Agents 1-3 may be prioritized as follows: Call Agent 1 has highest or first priority, Call Agent 2 has intermediate or second priority, and Call Agent 3 has the lowest or third priority. The reason for this is that the social graph of Call Agent 1 (FIG. 7) best matches with the social graph of Client A (FIG. 6), given that their social graphs include two common or similar nodes that are directly connected with the central node (i.e., nodes that represent social information for "fantasy football" and "ancient history" are each directly connected with Client A node and Call Agent 1 node) and they each further know the same person at a similar distance from the central node (i.e., the node representing the person "George Henry" is indirectly connected with each of the Agent 1 node and the Client A node via the "fantasy football" node). While the social graph for Call Agent 2 (FIG. 8) has one common or similar node as the social graph for Client A (the "fantasy football" node), there are not as many common or similar nodes as there are for the comparison of Call Agent 1 with Client A. However, since the social graph of Call Agent 3 (FIG. 9) does not have any similar or common nodes in relation to the social graph of Client A, Call Agent 3 has the least priority in relation to social matching with Client A.

Accordingly, in the scenario depicted by the social graphs of FIGS. 6-9, Call Agent 1 would be determined by the CCRE 10 as the best social match for Client A. In an embodiment in which social matching is given the greatest weight in algorithms to determine which call agent to route the call, the call from Client A would likely be routed to Call Agent 1. However, other conditions may affect whether the call is routed in this manner such as, e.g., whether the queue of customers holding for calls routed to Call Agent 1 is at or near a maximum amount (e.g., 3 or more customers are already waiting to connect with Call Agent 1). In such a scenario, the Client A call may instead be routed to Call Agent 2 (e.g., if Call Agent 2 has no customer calls waiting in his or her queue). Alternatively, algorithms implemented by the CCRE 10 for call routing may shift calls in the queue of Call Agent 1 to another call agent (e.g., Call Agent 2 or Call Agent 3) so that the Client A call can still be routed to Call Agent 1.

Thus, the CCRE 10 may implement any number of possible prioritization algorithms in combination with algorithms that prioritize based upon social information of call agents and customers, with designated weighting of such algorithms, in order to determine a best match for routing of customer calls to appropriate call agents at any given time or based upon a particular scenario.

In another embodiment, collected social information associated with a customer that is determined by the CCRE 10 as being of greater relevance in relation to other types of social information for other customers may be used as another factor for prioritizing and/or matching a customer call with one or more particular call agents, including prioritizing the time in which the customer call is connected with a call agent (e.g., moving the customer call ahead of other customers in a call waiting queue). For example, in a scenario in which the CCRE 10 identifies certain nodes of a customer's social graph as representing one or more persons or topics that are given greater weighting or prioritization in the routing algorithms being implemented (e.g., nodes of the customer's social graph represent a person such as an executive of a company of prioritized interest to the call center 6, or the nodes represent skills or other personal information associated with the customer that are of prioritized interest to the call center 6), such social information may result in a prioritized or faster routing of the customer call to a particular call agent. The social networking influence a customer may have can also be determined from the customer's social graph (e.g., based upon the number of postings the customer has for a particular topic and/or the number of views of such postings by others, such as the number of tweets and/or retweets associated with a customer's Twitter account that is identified in the social information obtained by the CCRE 10), and such influence may be used to elevate or prioritize the customer call status.

Figure 5:
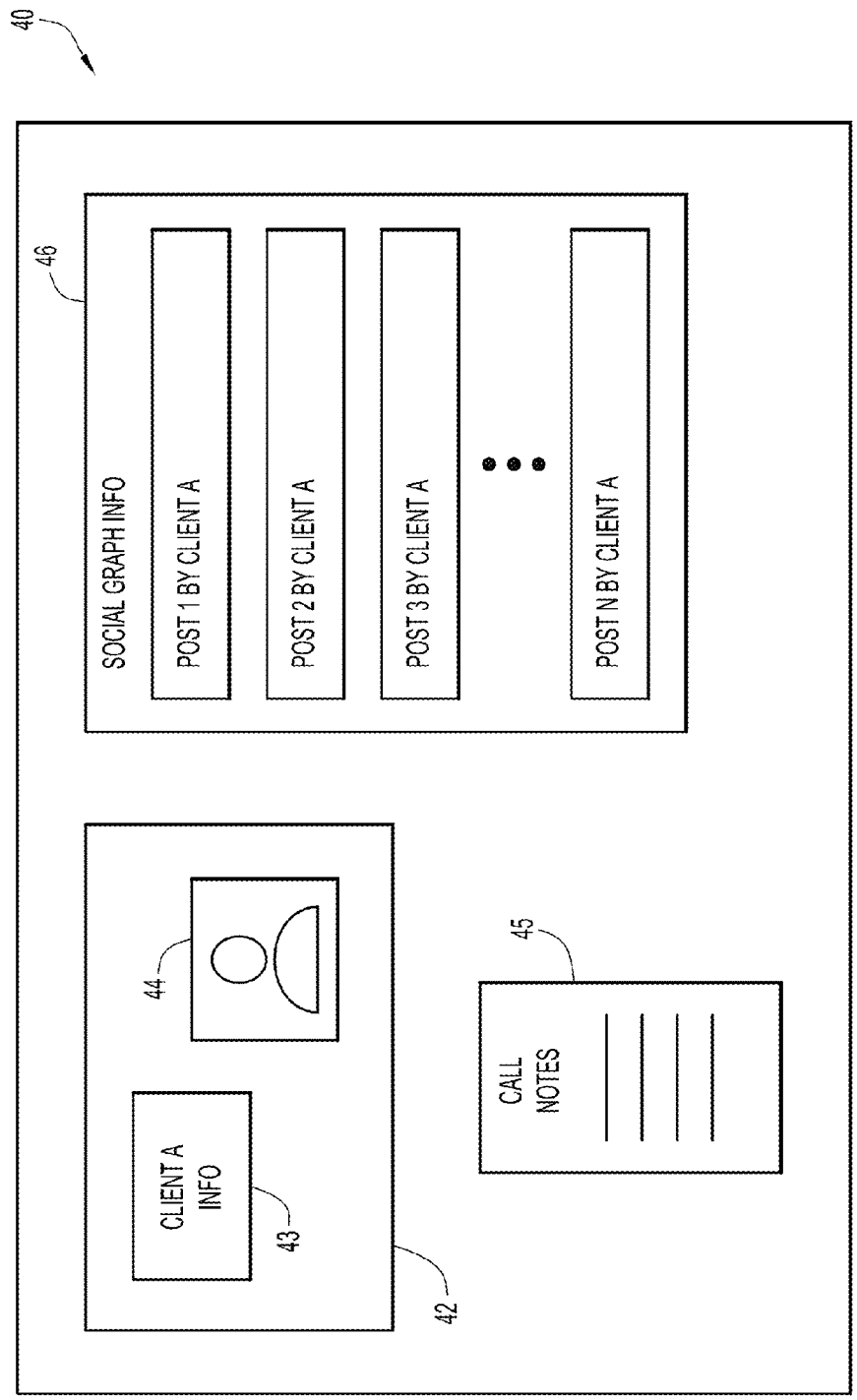
FIG. 5 is an example embodiment of a user interface displayed by a call agent device of the type depicted in FIG. 3.

At 150, after connecting the customer call with an appropriate call agent (based upon the call routing techniques previously described and which include consideration of social information for call routing determination), the call agent may be provided with the social information of the customer for use during the call. For example, a display of the call agent device 20 may include a user interface 40 as depicted in FIG. 5. The user interface 40 includes a window 42 including information 43 about the customer (Customer A) and optionally a profile or image 44 of the customer and also a window 45 that allows the call agent to provide notes associated with the call. In addition, the user interface 40 includes a social information window 46 that includes at least some collected social information of the customer (e.g., links to posts by Client A as depicted in FIG. 5, such as tweets from Twitter). The call agent can utilize this social information of the customer during the conversation with the customer to provide some insight in customer interests to the call agent which may enhance the communication experience and achieve a resolution for any issue the customer may have in a more efficient manner. Such information can also be used by the call agent to make suggestions in relation to the purchase by the customer of products and/or services (e.g., promoting the sale of products and/or services of the enterprise associated with the call center 6) that may be associated with the current social activities of the customer as indicated by the social information provided in window 46 (e.g., with promotions or discounts for such products/services also being offered to the customer in certain scenarios).

In certain scenarios, the social information associated with a customer and which is provided to the call agent (e.g., via the user interface 40) can also be utilized for promotion purposes in relation to the enterprise to which the call center 6 is associated. For example, consider a scenario in which the social information associated with a customer indicates that the customer is a prolific poster or blogger at one or more social information sources 50 (e.g., the customer has multiple posts and multiple followers in Twitter and/or Facebook). At some portion of the customer call (e.g., at the completion of the call in which customer issues were successfully resolved by the call agent), the call agent (having the knowledge that the posts of the customer are viewed by many followers) may request that the customer post a comment about his or her positive experience with the customer call for the enterprise.

Call agents can also adjust the social information of a customer (e.g., utilizing the user interface 40) to modify the social graph of the customer and/or weighting of social information attributes of the customer for use by the CRCE 10 in making call routing determinations. In particular, call agents can be provided with access to the social graph or social information of a customer and, based upon a call with the customer, make a determination that some social information items (e.g., represented as nodes on the customer's social graph) should be provided with either greater or less priority or weighting (e.g., adjusting the distance of a node from the central node representing the customer in the customer's social graph). For example, consider a scenario in which a call agent, after engaging in a call (or other type of communication) with a customer, determines that the customer has a significant interest in a particular social attribute A (e.g., a particular subject or person). The call agent may be provided with access to the social information and/or social graph of the customer to determine whether and to what extent social attribute A is represented. If the call agent believes the social attribute A should have a more significant representation in the customer's social information or social graph, the call agent can manually override the algorithms applied by the CRCE 10 (e.g., by adjusting the social graph such that a node representing social attribute A is prioritized by moving the location of the node closer in distance to the central node representing the customer). Alternatively, the social attribute A determined by the call agent as having significance for the customer can be prioritized or weighted by the call agent within stored social information for the customer, so that the next call by the customer will result in the social attribute A and its prioritization or weighting (as adjusted by the call agent) being factored with the other collected social information and resultant social graph that is generated or updated for the customer. Thus, call agents can provide feedback to further adjust the prioritization or weighting of social information of customers so as to enhance routing decisions made by the CRCE 10 when routing call from such customers to call agents.

The social information of customers can also be used for making hiring decisions for call agents based upon social information attributes of customers that may be common or prevalent. For example, if a large number of customers for an enterprise are determined as having one or more social information attributes that have a significant prioritization or weighting, this information can be used to hire or utilize call agents having similar social information attributes.

Thus, enhanced call routing by a CCRE in a contact center can be achieved by utilizing social information for customers and call agents as at least some criteria for matching customer calls with call agents. The techniques described herein can enhance call agent performance and the customer experience by potentially providing a better social match between call agent and customer in relation to typical or conventional call routing techniques. This in turn can lead to improved customer satisfaction in relation to an enterprise.

As previously noted, the techniques and related systems described herein are not limited to call center/call routing scenarios but instead are applicable in a more general sense to enhancing work flow in an enterprise (e.g., a business, a for-profit or non-profit organization or association, etc.) by routing work attributes to employees that have some social contextual relationship with the employees (i.e., work may be routed to an employee based upon the employee's social interests as identified by their social activities at social networking websites and/or other types of social information sources). This can lead to enhanced employee job satisfaction and productivity when employees are provided with work that may have some enhanced match with their social activities or social connections.

The above description is intended by way of example only.

What is claimed is:
1. A computer-implemented method comprising:
receiving incoming work at an enterprise, wherein the incoming work comprises an incoming communication request from a customer to a contact center;
obtaining social information for agents of the enterprise and obtaining social information for the customer from one or more social information sources, wherein the obtaining social information for the enterprise agents and for the customer comprises obtaining a social graph for enterprise agents and the customer, each social graph comprises a plurality of connected nodes, and each node represents a social information attribute;
comparing the social information obtained for the enterprise agents with information associated with the incoming work, wherein the comparing the social information comprises comparing social information obtained for the customer with obtained social information for each of the plurality of enterprise agents; and
assigning the incoming work to a selected enterprise agent based upon at least one common feature included in the social information for the selected enterprise agent and the incoming work, wherein assigning the incoming work comprises:
identifying the at least one common feature based upon the comparison of the social information obtained for the customer with the social information for each agent of the plurality of agents;
determining the selected enterprise agent from the plurality of enterprise agents based upon communication routing criteria, the communication routing criteria being at least partially dependent on the at least one common feature; and routing the incoming communication request from the customer to the selected enterprise agent to facilitate a communication between the customer and the selected enterprise agent.

2. The method of claim 1, wherein the communication routing criteria is further dependent upon other factors in addition to the at least one common feature, the other factors comprising call agent availability at the contact center and customer history information associated with the contact center.

3. The method of claim 1, wherein the comparing the social information for the customer with social information associated with a plurality of agents comprises:
comparing nodes including distances of the nodes from a central node of the social graph of the customer with nodes including distances of the nodes from a central node of the social graph for each enterprise agent.

4. The method of claim 1, further comprising:
facilitating modification of the social information obtained for the customer by the selected enterprise agent.

5. The method of claim 1, further comprising:
facilitating access by the selected enterprise agent to the social information obtained for the customer during the communication.

6. An apparatus comprising:
an enterprise communication device configured to enable communications with a plurality of enterprise agents, wherein the enterprise communication device comprises a call center routing engine for a contact center; and
a processor coupled with the enterprise communication device, and configured to:
receive incoming work at an enterprise, wherein the incoming work comprises an incoming communication request from a customer to the contact center;
obtain social information for the enterprise agents and obtain social information for the customer from one or more social information sources, wherein the obtaining social information for the enterprise agents and for the customer comprises obtaining a social graph for enterprise agents and the customer, each social graph comprises a plurality of connected nodes, and each node represents a social information attribute;
compare the social information obtained for the enterprise agents with information associated with the incoming work, wherein the comparing comprises comparing social information obtained for the customer with obtained social information for each of the plurality of enterprise agents; and
assign the incoming work to a selected enterprise agent based upon at least one common feature included in the social information for the selected enterprise agent and the incoming work, wherein assigning the incoming work comprises:
identifying the at least one common feature based upon the comparison of the social information obtained for the customer with the social information for each agent of the plurality of agents;
determining the selected enterprise agent from the plurality of enterprise agents based upon communication routing criteria, the communication routing criteria being at least partially dependent on the at least one common feature; and
routing the communication request from the customer to the selected enterprise agent to facilitate a communication between the customer and the selected enterprise agent.

7. The apparatus of claim 6, wherein the communication routing criteria is further dependent upon other factors in addition to the at least one common feature, the other factors comprising call agent availability at the contact center and customer history information associated with the contact center.

8. The apparatus of claim 6, wherein the processor is further configured to compare the social information for the customer with social information associated with a plurality of agents by:
comparing nodes including distances of the nodes from a central node of the social graph of the customer with nodes including distances of the nodes from a central node of the social graph for each enterprise agent.

9. The apparatus of claim 6, wherein the processor is further configured to facilitate modification of the social information obtained for the customer by the selected enterprise agent.

10. The apparatus of claim 6, wherein the processor is further configured to facilitate access by the selected enterprise agent to the social information obtained for the customer during the communication.

11. One or more computer readable storage devices encoded with software comprising computer executable instructions and when the software is executed operable to:
receive incoming work at an enterprise, wherein the incoming work comprises an incoming communication request from a customer to a contact center;
obtain social information for agents of the enterprise and obtain social information for the customer from one or more social information sources, wherein the obtaining social information for the enterprise agents and for the customer comprises obtaining a social graph for enterprise agents and the customer, each social graph comprises a plurality of connected nodes, and each node represents a social information attribute;
compare the social information obtained for the enterprise agents with information associated with the incoming work, wherein the comparing comprises comparing social information obtained for the customer with obtained social information for each of the plurality of enterprise agents; and
assign the incoming work to a selected enterprise agent based upon at least one common feature included in the social information for the selected enterprise agent and the incoming work, wherein assigning the incoming work comprises:
identifying the at least one common feature based upon the comparison of the social information obtained for the customer with the social information for each agent of the plurality of agents;
determining the selected enterprise agent from the plurality of enterprise agents based upon communication routing criteria, the communication routing criteria being at least partially dependent on the at least one common feature; and
routing the communication request from the customer to the selected enterprise agent to facilitate a communication between the customer and the selected enterprise agent.

12. The one or more computer readable storage devices of claim 11, wherein the communication routing criteria are further dependent upon other factors in addition to the at least one common feature, the other factors comprising call agent availability at the contact center and customer history information associated with the contact center.

13. The one or more computer readable storage media devices of claim 11, wherein the instructions are further operable to compare the social information for the customer with social information associated with a plurality of agents by:
  comparing nodes including distances of the nodes from a central node of the social graph of the customer with nodes including distances of the nodes from a central node of the social graph for each enterprise agent.

14. The one or more computer readable storage devices of claim 11, wherein the instructions are further operable to facilitate modification of the social information obtained for the customer by the selected enterprise agent.

15. The one or more computer readable storage devices of claim 11, wherein the instructions are further operable to facilitate access by the selected enterprise agent to the social information obtained for the customer during the communication.

* * * * *